3,428,728
TIMED RELEASE SUBLINGUAL MEDICATIONS
Hans Lowey, Larchmont, N.Y.
(7 Deerfield Lane, Mamaroneck, N.Y. 10543)
No Drawing. Continuation-in-part of application Ser.
No. 395,291, Sept. 9, 1964. This application Oct.
21, 1965, Ser. No. 500,157
U.S. Cl. 424—14                            4 Claims
Int Cl. A61k 9/00; A61j 3/06

ABSTRACT OF THE DISCLOSURE

Pharmaceutical tablets capable of releasing an active ingredient under controlled conditions during a period of between 15–60 minutes are prepared by cooking a mixture of sorbitol and gum acacia until the solids content is 65%, adding at least one artificial sweetener for sweetening and absorption regulation, cooling to 90° F., adding the active ingredient, converting the mixture into sublingual oral unit dosage form and administering the product sublingually while being able to discontinue medication at will.

---

This application is a continuation-in-part of application Ser. No. 395,291, filed Sept. 9, 1964, now abandoned.

The present invention relates to sublingual medications or tablets which have release characteristics of such nature that the medication is not released suddenly and rapidly, but over a short predetermined period of time beginning with administration and lasting approximately 1 hour or in the range of 15 to 60 minutes.

Conventional sublingual tablets are normally prepared for acute relief and are very short and rapid acting and immediately absorbed. This, for example is characteristic of sublingual nitroglycerin tablets taken for angina pectoris or related heart conditions. Ordinary oral tablets to be taken several times per day are also well known and some medication is now prepared in special sustained release dosage form wherein the active ingredient is released according to a desired pattern, for example, over a peroid of 6 to 12 hours.

According to the present invention, sublingual tablets are produced from which the active ingredient is not all immediately absorbed, but the active ingredient is released gradually and continuously over a short period of time of the order of 15 to 60 minutes from administration. It has been found that this is important and has unpredictable advantages. For example, nitroglycerin tablets in sublingual form and which act rapidly over a very short period of time cause serious or unpleasant side effects, such as flushing, headache, tachycardia and dizziness. Tablets embodying the present invention lack these drawbacks and have slower and continuous release without the side effects.

Conventional sublingual tablets are made from a base formula which usually consists of 15 parts of non-alcoholized cocoa powder, 15 parts of sucrose and 70 parts of lactose. Mannitol hexanitrate is often used as the base for sublingual tablets. I have discovered that these regular base compositions cannot be employed in the present invention and that it is necessary to use a special base composition in which a therapeutic dose of active ingredient is incorporated. For instance, when isoproterenol is used in ordinary sublingual tablets, the incidence of toxicity is about 33%. When the product is administered orally, there is often a 75% incidence of side effects. When administered systemically or in large oral doses or to sensitive individuals, the drug produces symptomatic electrocardiographic evidence of coronary insufficiency. Isoproterenol is nevertheless a valuable sympathomimetic agent and has been used as a bronchodilator sublingually in dosages of 5 to 20 milligrams.

Sublingual medications or tablets embodying the present invention comprise a sugarless base of special ingredients which release the active ingredient over a short period of time lasting 15 to 60 minutes after administration. This has valuable advantages in that the therapeutic and prophylactic effects last considerably longer than any conventional sublingual tablets and, in addition, it is possible to discontinue the medication if it is causing undesirable side effects by removing it from the mouth. Thus, the present invention resides in specially formulated sublingual therapeutic compositions which have some of the advantages of sustained release dosage forms and none of the disadvantages of immediate or very short acting dosage forms. It has further been found that side effects are eliminated or substantially reduced as these appear to be due primarily to the rapid absorption of ordinary sublingual tablets. My new dosage form also has a stabilizing effect upon products such as nitroglycerin and isoproterenol, in addition to the advantage that the patient may discontinue the medication by removing the tablet before it is completely dissolved during the 15 to 60 minute interval after administration. It has further been found that suitable therapeutic action as described above is obtained when the base for the medication contains sorbitol, gum acacia or gum arabic, citric acid, confectioners' glaze, calcium or sodium cyclamate and calcium or sodium saccharin. This base is specially prepared so that it disintegrates under the tongue during a 15 to 60 minute period after administration for a continuous release for absorption through the mucous membrane into the bloodstream. This is surprising and unexpected when it is considered that sorbitol normally disintegrates very rapidly, but when combined with gum arabic, a timed release disintegration is obtained during the 15 to 60 minute interval after administration. The sodium or calcium saccharin and the sodium or calcium cyclamate, while artificial sweentening agents, are included for the purpose of providing continuous and regular absorption through the mucous membrane. In this way the timing of the release of the active therapeutic agent can be controlled by the weight of the tablet.

A mixture of sorbitol and gum arabic or gum acacia are placed in a cooking kettle with agitators and cooked until there is 65% solids as determined with a refractometer. After cooking, dried color, flavor and citric acid are added and when the batch of material has cooled to 90° F., the active ingredient is added and the batch then placed in a cool receptacle and cast in tablet or other desired form in starch trays.

A separate base is prepared for an alertness product, such as one containing caffeine, in a formulation analogous to that of my copending application Ser. No. 368,-340, filed May 8, 1964 now abandoned. The coffee base using soluble coffee as in my aforesaid copending application can be prepared for a release time up to 1 hour, which is particularly important when caffeine is the active ingredient to be released.

The invention is illustrated by the following non-limitative examples.

EXAMPLE I

Nitroglyn 1/100 gr. Prolinguals

Formula:
- Liquid sorbitol, 37 lb. 8 oz.
- Powdered gum acacia, 7 lb. 8 oz.
- Nitroglycerin beta-lactose mixture, 5 oz.
- Color, 30 gr.
- Flavor, 2 oz.
- Calcium cyclamate, 5 oz. 313 gr.
- Soluble saccharin, 250 gr.

Formula for 20,000 pieces, molded to weigh 17.5 gr. each.

EXAMPLE II

Isoproterenol HCl 15 mg. Prolinguals

Formula:
- Liquid sorbitol, 37 lb. 8 oz.
- Isoproterenol HCl, 300 grams
- Color, 30 gr.
- Flavor, 2 oz.
- Calcium cyclamate, 5 oz. 313 gr.
- Soluble saccharin, 250 gr.

Formula for 20,000 pieces, molded to weigh 17.5 gr. each.

The formulations of Examples I and II are prepared by the cooking and agitating procedure described above.

EXAMPLE III

Caffeine ¼ gr. Prolinguals with coffee base

Formula:
- Soluble coffee, 14 lb.
  - Corn syrup solids, vegetable fat, sodium caseinate, lactose, dipotassium phosphate, artificial flavor, 6 lbs. emulsifier, riboflavin, carotene, together
- Caffeine, 11 oz. 188 gr.
- Calcium cyclamate, 5 oz. 313 gr.
- Soluble saccharin, 250 gr.

Formula for 20,000 tablets to be compressed at a weight of 7.25 gr. each.

EXAMPLE IV

Glyceryl guaiacolate 1½ grains

Formula:
- Liquid sorbitol, 37 lb. 8 oz.
- Powdered gum acacia, 7 lb. 8 oz.
- Glyceryl guaiacolate, 4 lb. 5 oz.
- Color, 30 gr.
- Flavor, 2 oz.
- Calcium cyclamate, 5 oz. 313 gr.
- Soluble saccharin, 250 gr.

Formula for 20,000 pieces, molded to weight 19 grains per piece. This formula is used as a cough preparation.

EXAMPLE V

Enzyme preparation

Formula:
- Liquid sorbitol, 37 lb. 8 oz.
- Powdered gum acacia, 7 lb. 8 oz.
- Amylase, 7 lb.
- Protease, 7 lb.
- Color, 30 gr.
- Flavor, 2 oz.
- Calcium cyclamate, 5 oz. 313 gr.
- Soluble saccharin, 250 gr.

Formula for 20,000 pieces, molded to weigh 22½ grains each. This preparation contains 2,000 units each of amylase and protease, but can be varied to contain from 1,000 to 10,000 units each. The product is used as a tooth-cleaning agent and in periodontures.

EXAMPLE VI

Terpin hydrate 5 gr., benzocaine 1 gr. Prolinguals

Formula:
- Liquid sorbitol, 37 lb. 8 oz.
- Powdered gum acacia, 7 lb. 8 oz.
- Terpin hydrate, 7 lb.
- Benzocaine, 3 lb.
- Color, 30 gr.
- Flavor, 2 oz.
- Calcium cyclamate, 5 oz. 313 gr.
- Soluble saccharin, 250 gr.

Formula for 20,000 pieces, molded to weigh 23½ gr. This product is used as an expectorant.

EXAMPLE VII

Dextromethorphan 25 mg.

Formula:
- Liquid sorbitol, 37 lb. 8 oz.
- Powdered gum acacia, 7 lb. 8 oz.
- Dextromethorphan, 1 lb. 2 oz.
- Color, 30 gr.
- Flavor, 2 oz.
- Calcium cyclamate, 5 oz. 313 gr.
- Soluble saccharin, 250 gr.

Formula for 20,000 pieces, molded to weigh 18 gr. This product is used as an antitussive.

The foregoing is intended as illustrative and not as limitative since, within the terms of the appended claims, various modifications may be made without departing from the invention. The invention is useful for a wide variety of products of the types given above by way of example, but for other active ingredients, including without limitation thereto cardiovascular agents, dilating agents, hormones, sedatives, antihistamines, analgesics, reducing agents, antispasmodics, stimulants, antitussives, expectorants, vitamins, enzymes and antiasthmatics.

In addition, the base can be so prepared as to provide no release for the first 5 to 10 minutes followed by the gradual and continuous release above noted. This is advantageous where it is desired to start the medication after a short time delay to permit the patient to change his location or reach a nearby destination.

What is claimed is:

1. A sublingual method of administering medication, absorbable through the mucous membranes of the mouth into the blood stream in a timed release pattern dependent on the total weight of the medication, and a base in which it is incorporated and formed into tablets, which method consists in inserting a tablet into the mouth beneath the tongue and holding it there for 15 to 60 minutes while the medication is taking effect and removing the partially used tablet when medication is to be discontinued or undesirable side effects occur, the tablet consisting essentially of a therapeutic amount of an active ingredient and a sugarless base of sorbitol and gum acacia to which has been added sodium or calcium saccharin or cyclamate for artificial sweetening and for providing continuous and regular absorption through said mucous membranes while the preparation is disintegrating under the tongue, said tablet releasing the active ingredient over a period of 15 to 60 minutes after administration and having been produced by mixing sorbitol and gum acacia and cooking the same until the mixture contains 65% of solids, adding at least one of sodium or calcium saccharin or cyclamate as sweetening and absorption control agent, cooling to 90° F., adding the active ingredient and forming the resulting product into individual oral unit dosage form tablets.

2. A method according to claim 1 in which the active ingredient is nitroglycerin.

3. A method according to claim 1 in which the active ingredient is isoproterenol.

4. A method according to claim 1 in which the active ingredient is glyceryl guaiacolate.

(References on following page)

References Cited

UNITED STATES PATENTS

| | | | |
|---|---|---|---|
| 2,841,528 | 1/1958 | Myhre | 167—82 |
| 2,878,160 | 3/1959 | Smedresman | 167—82 |
| 2,887,436 | 5/1959 | Klioze et al. | 167—81 |
| 2,887,437 | 5/1959 | Klioze et al. | 167—81 |
| 2,887,439 | 5/1959 | Klioze et al. | 167—82 |
| 2,926,121 | 2/1960 | Hobbs et al. | 167—82 |
| 3,069,317 | 12/1962 | Jensen | 167—55 |
| 3,200,039 | 8/1965 | Thompson | 167—82 |
| 3,248,290 | 4/1966 | Zentner | 167—55 |
| 3,346,449 | 10/1967 | Magid | 167—55 |

LEWIS GOTTS, *Primary Examiner.*

S. K. ROSE, *Assistant Examiner.*

UNITED STATES PATENT OFFICE
CERTIFICATE OF CORRECTION

Patent No. 3,428,728　　　　　　　　　　　　　　February 18, 1969

Hans Lowey

It is certified that error appears in the above identified patent and that said Letters Patent are hereby corrected as shown below:

Column 3, between lines 20 and 21, insert -- Powered gum acacia, 7 lbs. 8 oz. --; lines 38 and 39, cancel "6 lbs." and insert the same after "carotene,", same column 3, line 39.

Signed and sealed this 24th day of March 1970.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents